(12) United States Patent
Guarneri et al.

(10) Patent No.: US 9,658,723 B2
(45) Date of Patent: May 23, 2017

(54) METHOD AND SYSTEM FOR DETECTING THE PRESENCE OF A FINGER OR A HAND IN THE PROXIMITY OF A TOUCHLESS SCREEN, CORRESPONDING SCREEN DEVICE, AND CORRESPONDING COMPUTER PROGRAM PRODUCT

(71) Applicant: STMicroelectronics S.r.l., Agrate Brianza (IT)

(72) Inventors: Nunziata Ivana Guarneri, Caltanissetta (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 302 days.

(21) Appl. No.: 14/321,256

(22) Filed: Jul. 1, 2014

(65) Prior Publication Data

US 2015/0002461 A1    Jan. 1, 2015

(30) Foreign Application Priority Data

Jul. 1, 2013   (IT) .............................. TO2013A0549

(51) Int. Cl.
*G06F 3/044*   (2006.01)
*G06F 3/0488*  (2013.01)

(52) U.S. Cl.
CPC .......... *G06F 3/044* (2013.01); *G06F 3/04886* (2013.01); *G06F 2203/04104* (2013.01); *G06F 2203/04108* (2013.01)

(58) Field of Classification Search
None
See application file for complete search history.

(56) References Cited

U.S. PATENT DOCUMENTS

2009/0284495 A1    11/2009  Geaghan et al.
2009/0309851 A1*   12/2009  Bernstein .............. G06F 3/0416
                                                         345/174

(Continued)

OTHER PUBLICATIONS

Search Report for Italian patent application No. TO20130549; The Hague, Holland, Feb. 12, 2014, 2 pages.

(Continued)

*Primary Examiner* — Kent Chang
*Assistant Examiner* — Benjamin Morales Fernandez
(74) *Attorney, Agent, or Firm* — Seed IP Law Group LLP

(57) ABSTRACT

Detecting the presence of a finger in proximity of a screen that generates detection signals in the horizontal direction and vertical direction includes sampling the detection signals and generating raw-data vectors X and Y. The raw data have a maximum for elements of the vector that define the position of the finger on the screen in the directions X and Y, respectively. The vectors X and Y are divided into subsets defined as "macro-areas" and cumulative values computed of each macro-area by adding together all the elements of the vector X and of the vector Y that belong to the macro-area. The maximum values are selected from among horizontal cumulative values and vertical cumulative values. A value identifying the macro-area selected on the basis of the maximum values is supplied, or no value supplied in the presence of elements of disturbance in the proximity of the screen.

18 Claims, 10 Drawing Sheets

(56) References Cited

U.S. PATENT DOCUMENTS

| | | | | |
|---|---|---|---|---|
| 2010/0289754 A1* | 11/2010 | Sleeman | ............... | G06F 3/0416 345/173 |
| 2010/0295810 A1* | 11/2010 | Nagata | .................. | G06F 3/0416 345/173 |
| 2012/0050210 A1* | 3/2012 | King | ..................... | G06F 3/0416 345/174 |
| 2012/0262419 A1* | 10/2012 | Hershman | ............... | G06F 3/044 345/174 |
| 2012/0280923 A1 | 11/2012 | Vincent et al. | | |
| 2013/0016045 A1* | 1/2013 | Zhao | ..................... | G06F 3/0416 345/173 |
| 2013/0100067 A1* | 4/2013 | Dews | ...................... | G06F 3/044 345/174 |
| 2013/0124140 A1* | 5/2013 | Jang | ........................ | G06F 3/011 702/150 |
| 2014/0099924 A1* | 4/2014 | Kim | ..................... | H04L 63/168 455/411 |

OTHER PUBLICATIONS

Aviv et al., "Smudge Attacks on Smartphone Touch Screens," WOOT '10—Proceedings of the 4$^{th}$ USENIX Conference on Offensive Technologies, Washington, DC, 2010, 10 pages.

Cai et al., "TouchLogger: Inferring Keystrokes on Touch Screen From Smartphone Motion," HotSec '11 —Proceedings of the 6$^{th}$ USENIX Conference on Hot Topics in Security, San Francisco, CA, 2011, 6 pages.

Owusu et al., "ACCessory: Password Inference using Accelerometers on Smartphones," HotMobile '12—Proceedings of the 12$^{th}$ Workshop on Mobile Computing Systems & Applications, San Diego, CA, 2012, 6 pages.

* cited by examiner a)  b)

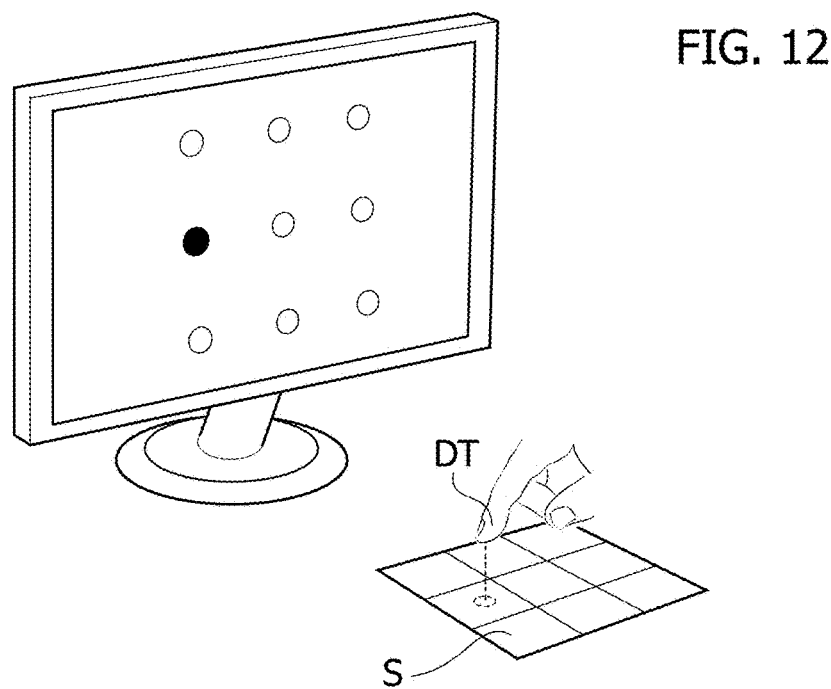
FIG. 12
FIG. 13
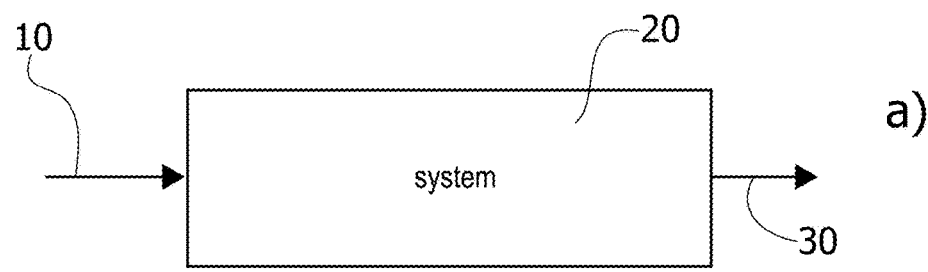
a)
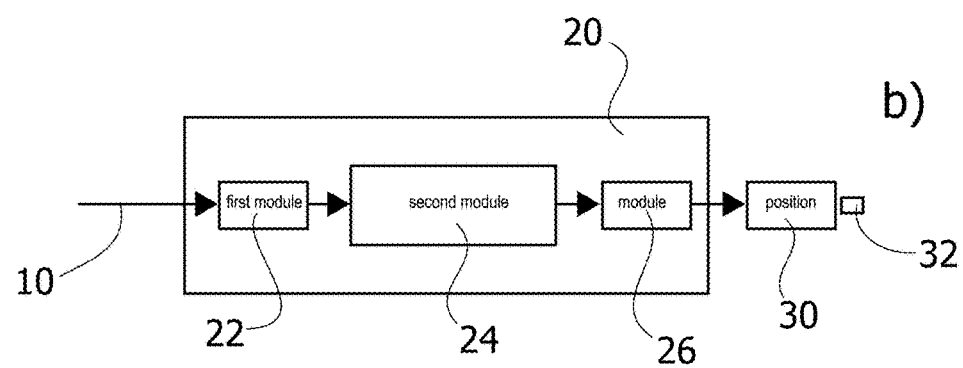
b)

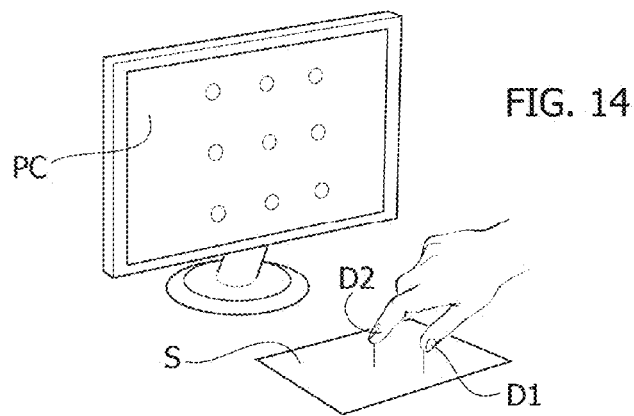
FIG. 14
FIG. 15
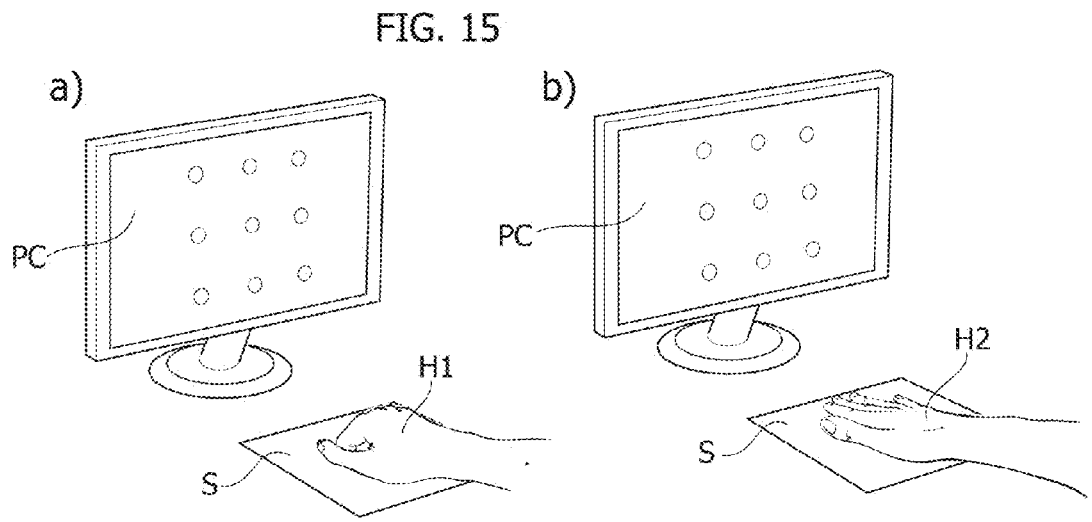
FIG. 16
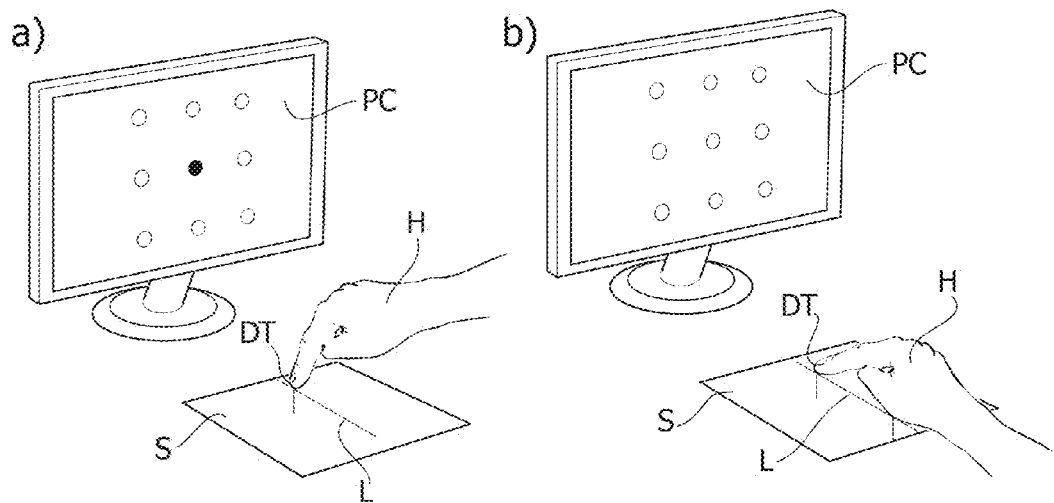

METHOD AND SYSTEM FOR DETECTING THE PRESENCE OF A FINGER OR A HAND IN THE PROXIMITY OF A TOUCHLESS SCREEN, CORRESPONDING SCREEN DEVICE, AND CORRESPONDING COMPUTER PROGRAM PRODUCT

PRIORITY CLAIM

The instant application claims priority to Italian Patent Application No. TO2013A000549, filed 1 Jul. 2013, which application is incorporated herein by reference in its entirety.

TECHNICAL FIELD

The disclosure relates to detection of a finger (or hand) hovering in the proximity of a screen of a touchless type, which exploits a projected capacitive technology. This technology enables activation of the touch functions, typical of touch screens, even without touching the screen directly, but acting at a distance therefrom.

SUMMARY

Current touch screens work in mutual-sensing technology.

In these screens, the control system measures each intersection of each row and column of a virtual grid in which the surface of the screen is assumed to be divided, and produces unique pairs of touch coordinates (which indicate the position in which touching by the finger has occurred). There results therefrom a precise detection of the position of the finger on the screen.

With reference to FIGS. 3 and 4, when a finger DT touches a screen S in mutual-sensing technology, the controller reads all the pairs of co-ordinates (x and y) of the nodes excited by the finger DT. In particular, the finger DT excites an area Z of the screen S that expands concentrically around the point of contact PE.

This is possible because the controller reads the variation of capacitance at the intersection of each row and column of the virtual grid into which the screen is divided; hence, the data detected can advantageously be arranged in the form of a 2D matrix.

With particular reference to FIG. 4, the node PA corresponds to the pair of co-ordinates x2 and y0, whilst the node PB corresponds to the co-ordinates x1 and y3.

When a finger touches the area of the point PA (or PB), the corresponding nodes PA and PB are excited (and also the adjacent nodes), and the controller returns at output the coordinates of the points of contact with the finger. There is thus in this case a precise detection of the area of interaction between the finger and the screen.

It has been noticed that the traces left by the finger on the screen of electronic devices may enable reconstruction of the password for unlocking the device.

FIG. 10 illustrates an example of a path traced on the screen by a finger that touches sequentially the areas C1, C2, C3, C4 and C5. It is thus possible to identify the password by analyzing the sequence of change of direction of displacement of the finger over the areas.

FIGS. 11(a) and 11(b) illustrate examples of traces left on the screen of a phone by a finger in touch mode.

Using photographs taken under different conditions of lighting and with different positions of the photographic camera, in many situations it is possible to reconstruct completely or partially the path followed by the finger. In any case, there is background noise present, generated by use of the applications of the device, or a distortion caused by accidental contact with items of clothing, but the reconstruction of the password is almost always possible.

FIG. 11(a) shows an example of a path OT that the finger DT follows on the screen S for entering a password. It is noted that the directionality of the path typically can be clearly determined at each reversal and change of direction.

FIG. 11(b) shows the phone of FIG. 11(a) after it has been rubbed with a cloth and after it has repeatedly been put into and taken out of a pocket or a purse. In this case provided by way of example, some changes of direction have been lost, in particular in the top left portion of the path.

An alternative technique for reconstructing the password that has been entered is based upon reading of movement sensors (for example, accelerometers). These sensors are an excellent source for extracting entire sequences of text entered on a keypad of a touch screen.

Unlike the other sensors present in current mobile phones, accelerometers do not require special privileges for accessing the operative systems of current smartphones.

It has been found experimentally that by using the measurements made by the accelerometers, it is possible to extract a password of six characters in less than four or five attempts (on average).

Mobile devices may be expected to have a system of protection and secure access. This protection system enables the user to access the services and the data stored in the device itself only after it has been unlocked, for example, by entering a numeric password on the screen.

A problem of devices equipped with touch screens is represented by the security that they afford for their users. In particular, the traces left by a finger on the screen, and the data collected by the accelerometers present in the device, may be used for reconstructing the passwords usually employed for rendering these devices more secure.

In the last few years, some researchers have studied and developed systems capable of inferring the password for unlocking devices equipped with touch screens. Some activities regard analysis of finger marks left on the screen, others regard analysis of the movement data detected by high-precision sensors, such as accelerometers or gyroscopes present in the device.

Some studies have found that there exists the possibility of reconstructing easily and quickly the password entered by the user by following the marks left on screens by fingers or exploiting the information coming from the movement sensors.

A wide range of applications of touch screens and touchless screens involves the technology for detecting the presence of a finger in the proximity of the screen (hovering finger): smartphones, tablets, navigators, interactive display devices of various sorts, control panels, and remote controls of various types are examples of such applications.

Current mobile devices, such as smartphones and tablets, are widespread and their users increasingly employ them also for carrying out operations that involve sensitive data. Critical operations are, for example, on-line financial transactions and confidential personal communications. During such operations, secret passwords are, for example, entered, which if they are made available by the device and reconstructed by third parties, may cause problems of security of the device.

For many of these applications, such as, for example, unlocking of a device that requires typing in of a password on the screen, in order to increase the privacy, security, and protection of the user, it may be of interest to be able to determine the position of the finger on the screen, without actually touching it.

In these applications, it is hence useful to envisage the case of a finger floating or hovering at a distance of between approximately 3 and 10 cm from the screen.

Usually, touchless devices are also devices that can work in touch mode; hence, the two technologies, namely, the self-sensing one and the mutual-sensing one coexist, and the device is able to pass from one mode to the other according to the variation in the capacitive signal that it detects. In general, the device operates in touch mode when the finger touches the screen (finger-screen distance of 0-1 mm); above a distance of one millimeter, the device passes into touchless mode up to a distance of approximately 10 cm.

For many applications, it may be useful to resort to detection of the presence of a finger in the proximity and in a given position of the touchless screen.

In particular, in the present description, reference is made to interactive screens that exploit a proximity detection technology, which enable identification of the area of the screen on which the finger is present and encoding of said area so as to return to the system a value representing the area of the screen involved.

Touchless screens thus make it possible to have a control of the screen without any direct contact between the screen itself and the finger (or hand).

Certain embodiments may regard a corresponding method, a corresponding system, a corresponding touchless-screen device, as well as a corresponding computer-program product that can be loaded into the memory of at least one processing device and that includes portions of software code for implementing the steps of a method according to an embodiment when the product is run on such a device. As used herein, it is understood that reference to such a computer-program product is equivalent to reference to a computer-readable means containing instructions for controlling an electronic device so as to coordinate execution of a method according to an embodiment. Reference to "at least one computer" is to be understood as highlighting the possibility of certain embodiments being implemented in a distributed or else a modular way.

Various embodiments may regard unlocking of a device protected by a password. Unlocking of the device may be obtained, for example, by entering the numeric password on the screen of the device in a hovering way.

Different embodiments may moreover regard recognition of the position and corresponding gestures of a hand in the proximity of a screen, for example for operations of zooming-in or zooming-out on a device.

Various embodiments may regard a method for detecting the presence of a finger, in the proximity of a screen that generates detection signals in the horizontal direction X and in the vertical direction Y, where the signals represent the presence of a finger in a position on the screen, and wherein the method comprises:

sampling the detection signals and generating raw-data vectors X and Y, where the raw data have a maximum for the elements of the vector that define the position of the finger on the screen in the direction X and in the direction Y, respectively;

dividing the aforesaid vectors X and Y into subsets referred to as "macro-areas";

computing the cumulative values (A, B, C, D, E, F) of each macro-area by adding together all the elements of the vector X and of the vector Y that belong to the macro-area;

selecting the maximum values from among the horizontal cumulative values (A, B, C) and the vertical cumulative values (D, E, F) and supplying at output a value that identifies the macro-area selected on the basis of the maximum values of the cumulative values, or no value at all in the case of the presence of elements of disturbance in the proximity of the screen.

The process may include generating a matrix M representing the screen starting from the raw-data vectors X and Y and computing each individual element of the matrix M as mean value of the corresponding raw data X and Y according to the formula $$M(i, j) = \frac{X(i) + Y(j)}{2}$$

In various embodiments, a method envisages dividing the aforesaid matrix M into macro-areas and computing the cumulative values of each macro-area by adding together all the elements of the matrix M that belong to the macro-area itself.

In various embodiments, a method envisages finding the minimum value from among the aforesaid cumulative values calculated and, if the minimum value exceeds a threshold, not returning any value at output.

In various embodiments, a method envisages associating to each macro-area a numeric value or digit that identifies the macro-area and repeating a plurality of times the method of detection to obtain a sequence of successive macro-areas selected so as to form an unlocking sequence or password.

In various embodiments the detection signals are analyzed on a plurality of successive frames in a given time frame, and a method enables recognition of:

a hovering action if the maximum of the above signals moves in the given time frame over different macro-areas; or a zooming action if the maximum of the above signals varies in intensity but there is no change in macro-area in the aforesaid time frame.

BRIEF DESCRIPTION OF THE DRAWINGS

Various embodiments will now be described purely by way of example, with reference to the attached drawings, wherein:

FIG. 12 shows a representation of detection of a finger in the proximity of a screen and in a given area.

FIGS. 13(a) and 13(b) are block diagrams exemplifying a system for detecting a finger and for selecting a macro-area on a screen.

FIGS. 14, 15, and 16 are examples of particular situations of presence of a finger/hand in the proximity of a screen (two fingers, fist, open palm, presence of a finger and of the fist);

DETAILED DESCRIPTION

Illustrated in the ensuing description are various specific details aimed at providing an in-depth understanding of various examples of embodiments. The embodiments may be obtained without one or more specific details, or else with other methods, components, materials, etc. In other cases, known structures, materials, or operations are not represented or described in detail so that various aspects of the embodiments will not be obscured. Reference to "an embodiment" or "one embodiment" in the present description indicates that a particular configuration, structure, or characteristic described with reference to the embodiment is included in at least one embodiment. Hence, phrases such as "in an embodiment" or "in one embodiment" that may be present in various points of the present description do not necessarily refer to one and the same embodiment. Furthermore, particular configurations, structures, or characteristics may be combined in any adequate way in one or more embodiments.

The references used herein are provided in order to facilitate the understanding of the reader, and hence do not define the sphere of protection or the scope of the embodiments.

In the first place, it is useful to understand the differences between mutual-sensing technology, used for carrying out the touch functions that have already been described briefly, and self-sensing technology, used for carrying out touchless functions.

In the latter case, i.e., in the case of touchless functions, it is possible to detect a finger or a hand in the proximity of the screen (but not in contact therewith) and to recognize the gestures of the finger or hand in space in the proximity of the panel of the screen (for example, for operations of hovering and zoom-in and zoom-out).

In various examples of embodiments considered herein, there is proposed a solution for devices equipped with screens with projected capacitive technology. Unlocking of the device is obtained through detection of the successive positions of the finger in a modality where it is hovering over different areas of the screen of the device. Associated with each area is a digit (1, 2, 3, 4, 5, 6, 7, 8, 9), and the sequence of digits selected in a hovering way represents the unlocking password.

A major characteristic of projected capacitive technology in a self-sensing mode is that the system controller reads the data in the direction X independently of the data in the direction Y.

On account of the evident technological differences, it is typically not possible to use the same algorithms used for touch technology.

Using devices equipped with a touchless screen with projected capacitive technology, i.e., with self-sensing, it is possible to provide a more intuitive interface between the user and the device that includes the touchless screen.

In this way, recognition of the hovering finger enables assurance and guarantee of a greater security of the device.

Figure 1:
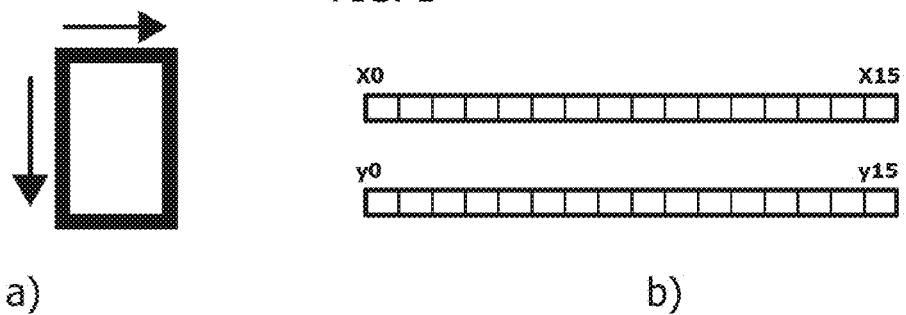
FIG. 1(a) shows an example of a screen and FIG. 1(b) shows the two vectors X and Y that correspond to the nodes of the screen.

In various embodiments, and with particular reference to FIG. 1a, the screen used is, for example, a 7-in screen, with a distribution of the nodes having sixteen capacitive nodes on the longer side of the panel, and sixteen capacitive nodes on the shorter side of the panel (see FIG. 1b).

Hence, the screen is divided up so as to have a resolution of sixteen nodes on both the horizontal side X and the vertical side Y. FIG. 1b shows a representation of the two vectors of the nodes X and Y.

Figure 2:
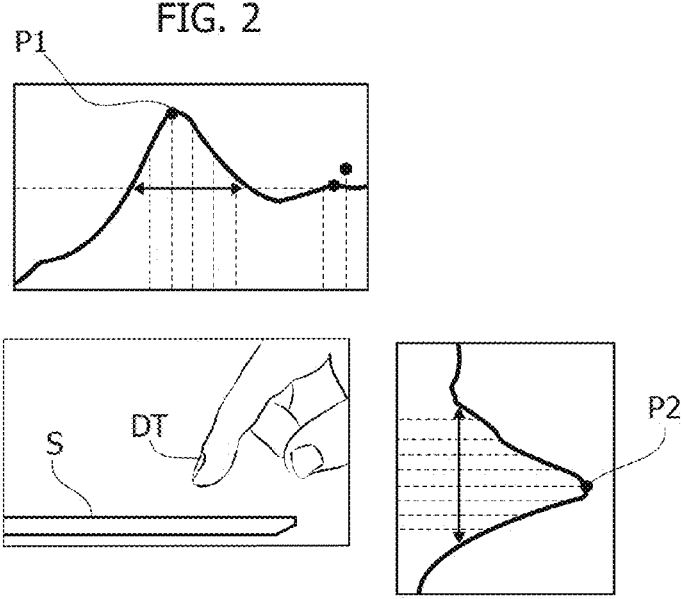
FIG. 2 shows the profiles of the capacitances of the nodes X and Y in the case of a finger in the proximity of a screen.
Figure 3:
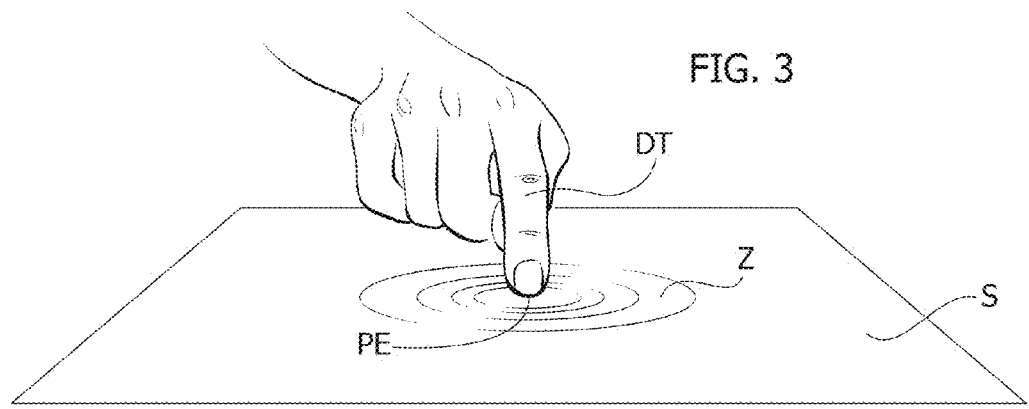
FIG. 3, which has already been described, shows a finger in contact with a screen and the area of excitation of the nodes adjacent to the point of contact.
Figure 4:
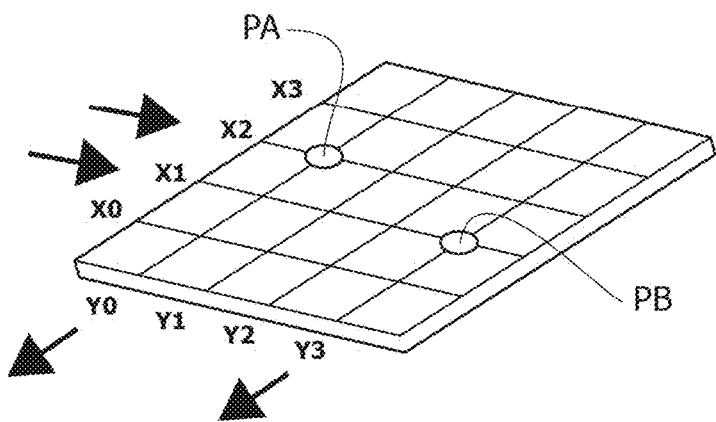
FIG. 4, which has already been described, and FIG. 6, which regards self-sensing technology, show the division of a screen into nodes.

FIG. 2 illustrates an approach of a finger to the panel of a screen S. When the finger DT approaches the center of the panel, the profiles in the horizontal direction X and in the vertical direction Y show two peaks, respectively P1 and P2, the coordinates of which are chosen as the 2D position in two dimensions (x, y) of the finger DT on the screen S.

In particular, in the condition illustrated, the finger DT is detected in position 8, 9 (x=8, y=9).

When a finger approaches the screen S, the controller first reads all the raw data in the direction "X" and then reads all the raw data in the direction "Y" (or vice versa), without providing any information on the pair (x, y) regarding the 2D position of the finger on the screen S.

From an analysis of the raw data X and Y, it may be noted that the most significant pair of coordinates of the finger is given by the maximum value of the raw data in the direction X, and by the maximum value of the raw data in the direction Y.

The nodes PA and PB are recognized and do not present problems of detection.

Figure 5:
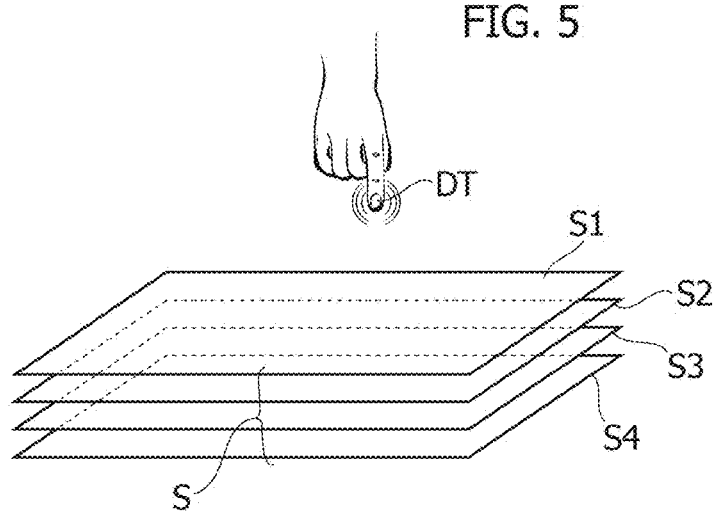
FIG. 5 shows a finger in the proximity of a screen and the boundary between touch technology and touchless technology.
Figure 6:
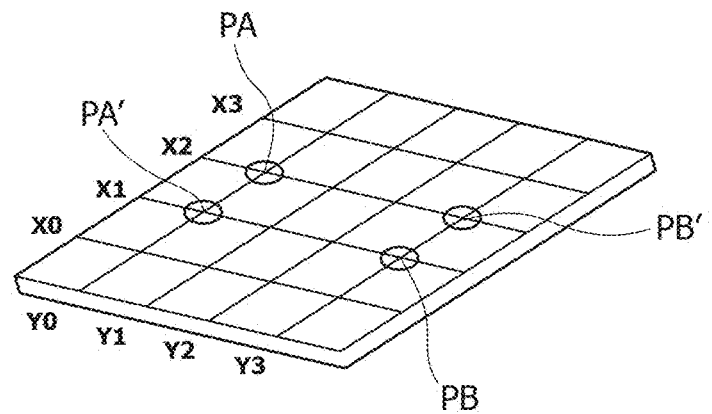

Unlike what occurs in touch technology, with reference to FIGS. 5 and 6, the raw data returned by screens in self-sensing technology are not made available in the form of a matrix.

FIG. 6 refers to self-sensing technology. In the case of self-sensing technology, the controller returns at output for each node a cumulative value of capacitance. For instance, looking at FIG. 6, the node X1 has a value that is given by the sum of all the capacitive values of the nodes that are located along the row X1. Likewise, the value read on the node Y0 is given by the sum of all the capacitive values of the nodes located along the column Y0. This applies to all the nodes both on X and on Y. The "ghost" problem, explained more fully in the sequel of the present description, is linked to this type of reading performed by the controller. A finger DT is recognized as approaching a screen S by the system controller. The distance between the finger DT and the screen S can be divided into four different levels, of which two levels belong to the user end and two to the screen end.

In particular, the level S4 (0 mm) is the logic level zero of touch detection, i.e., the finger DT is in contact with the screen S. The level S3 (1 mm) is the logic level one of touch detection (i.e., the finger DT skims the screen S). The level S2 (approximately 3 mm) delimits the boundary of monitoring of the hovering finger, i.e., at more than 3 mm the finger is detected and identified as hovering over the screen S. The level S1 (10 mm) identifies the boundary of detection of vicinity of the finger DT, i.e., beyond that distance the screen S no longer identifies the presence of a finger DT over it.

In particular, for distances of less than 1 mm touch is defined; for distances between 3 mm and 10 cm the finger is defined as "hovering" over the screen S.

With reference to FIG. 6, in the case of self-sensing technology there is, for example, the problem of "ghost-points", i.e., the points PA'(x1, y0) and PB'(x2, y3) mask the coordinates of the points on which the two fingers lie in the proximity space (PA(x2, y0) and PB (x1, y3)).

Consequently, it is typically not possible to use the solutions developed for mutual-sensing technology for self-sensing technology.

To explain this concept better, it may be useful to describe what happens when two fingers approach the screen in self-sensing technology.

Figure 7:
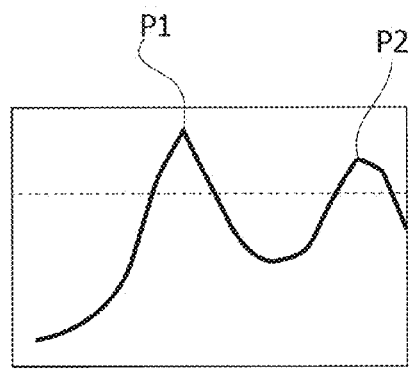
FIG. 7 shows the profiles of the capacitances of the nodes X and Y in the case of two fingers in the proximity of a screen.

FIG. 7 shows the 16-point profile of the raw data in the directions X and Y in the case of two fingers above the screen.

The profile of the raw data in X and the profile of the raw data in Y both present two peaks: P1 and P2, and P3 and P4.

As shown in FIG. 7, both of the profiles of raw data in X and in Y show two peaks (P1 and P2) and (P3 and P4), but in this situation the controller does not provide any information on the pairs (x, y) of co-ordinates of the index finger or of the thumb. Thus, the system behaves as if no finger has been detected in the proximity.

This is the so-called "ghostpoint problem".

In the case of the example of FIG. 7, the controller does not return any value, i.e., does not return any pair of coordinates, and behaves as if it had not detected the presence of a finger in the proximity of the screen.

As may be appreciated, this phenomenon is markedly amplified when a hand with the palm open, or a closed fist, is located in the vicinity of the screen.

In this case, the presence of a large conductor leads to a marked variation of the capacitance both on the data in X and on the data in Y.

Consequently, in the case where a finger plus a palm is placed in the proximity of the screen, the system controller could have problems in recognizing the presence of the finger. In particular, the presence of the palm could occlude or mask the peak due to the finger. Hence, on account of the presence of the palm, the controller could arrive at an erroneous detection of the position of the finger, or even at no detection of the finger at all.

Figure 8:
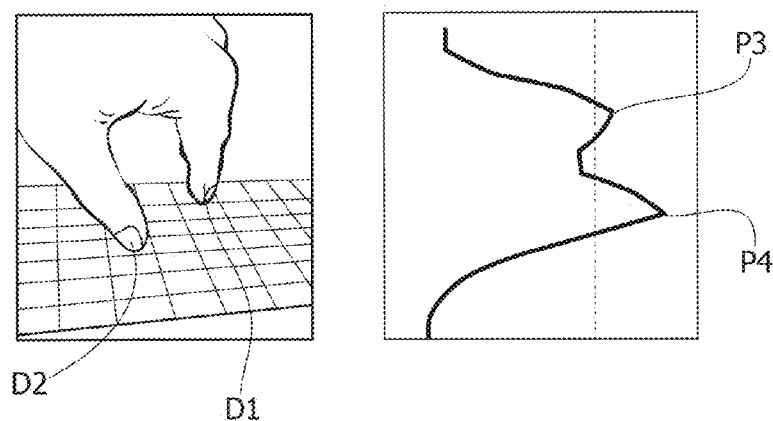
FIG. 8 is a 2D matrix constructed using the raw data X and Y.

FIG. 8 shows an example of a 2D matrix constructed starting from the raw data 16X and 16Y detected by the system.

In the example proposed, the 2D matrix has a size of 16×16, and has been constructed starting from the 1D representation of the raw data in the directions X and Y.

Each element of the matrix is computed as the mean value of the corresponding raw data X and Y, i.e., each element of the matrix is computed as $$M(i, j) = \frac{X(i) + Y(j)}{2}$$

with the indices i and j ranging between 0 and 15.

In various embodiments, the 2D matrix is a good representation of the data for the field of application considered.

In particular, in the various embodiments considered herein, an aim is to detect the position of a finger or of a hand not at the level of precision of one node on the screen, but at a lower level of precision. The level of precision considered for the applications deemed herein of interest is a macro-area level. These macro-areas may be defined by dividing up in a regular way the 2D matrix constructed previously.

In the various embodiments, the number and size of the macro-areas can be selected differently on the basis of the size of the screen and according to the application.

In various embodiments considered herein, detection of the finger is made at a rough level of precision, as opposed to other applications in which a more precise detection is performed, for example with a precision at the node level.

Figure 9:
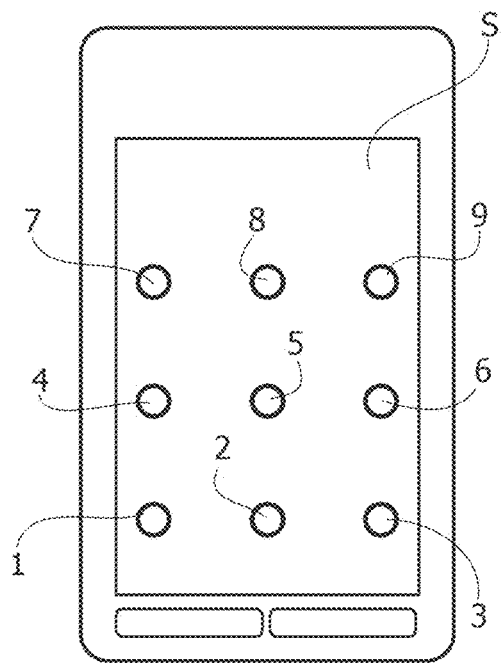
FIGS. 9 and 17 show the division of a screen into nine macro-areas.
Figure 10:
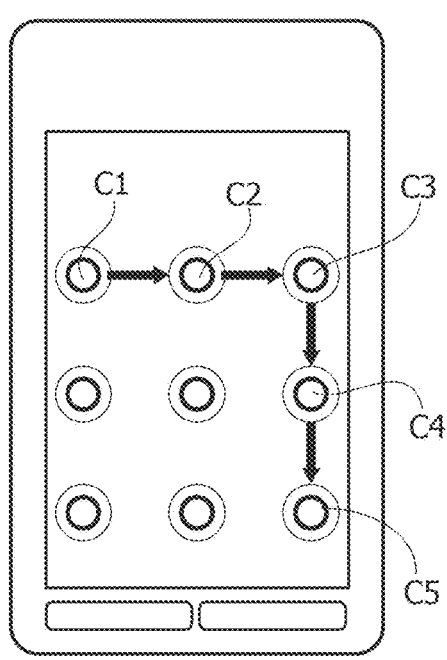
FIG. 10 shows an example of a path described by a finger on a touch screen.
Figure 11:
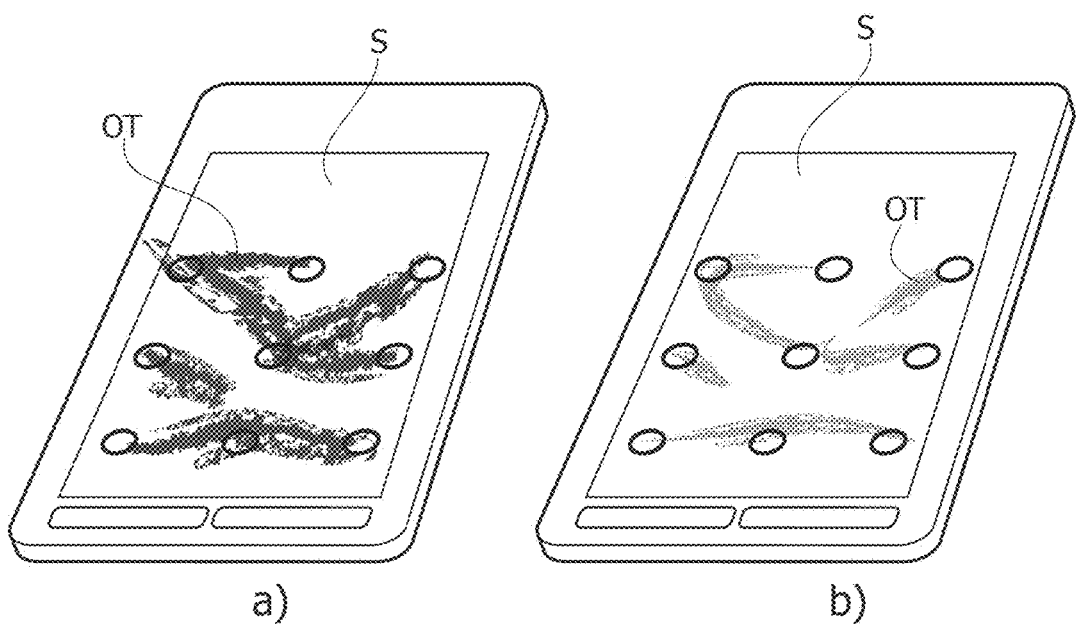
FIGS. 11(a) and 11(b), which have already been described, show the traces left by a finger in the case of touch technology.

In the case of the example illustrated in FIG. 9, the portion of screen S designed for entry of a password has been divided into nine macro-areas.

In various embodiments, the application is oriented towards detection of the presence of a finger on one of the nine macro-areas into which the screen is divided, and by repeating this detection a number of times so as to identify the sequence of digits selected to form the password.

In various embodiments, the division into nine macro-areas is useful, for example, for those applications in which entry of a numeric password or unlocking PIN is required.

This type of application has been developed to overcome the problems of inference of a password on a device. In particular, an embodiment can be used in all the applications based upon entry of a numeric password or a PIN (password for unlocking the mobile telephone, PIN in ATMs, recognition of user ID, etc.).

For all these applications, projected capacitive technology enables an increase of the levels of security.

In various embodiments, the number of the macro-areas has been chosen equal to nine, but only by way of non-limiting example. In the following of the description, a different embodiment will be described in which the number of macro-areas is different.

With reference in particular to FIG. 9, the choice of the nine macro-areas is dictated by the size of the typical matrix (3×3) used on screens of devices for display of digits (1, 2, 3, 4, 5, 6, 7, 8, 9) that are used for entry of a PIN or a numeric password.

Various embodiments propose a system capable of detecting a sequence of positions of the finger in the proximity of the screen (each position is chosen from among the nine areas associated with the digits), and recognizing entry of the password for unlocking the device in a hovering way.

As already mentioned previously, the choice of the nine macro-areas is a choice preferred for various embodiments, but the 3×3 matrix (nine positions) can be varied in accordance with the resolution of the screen for other types of applications.

Hence, the system, described herein in various embodiments with reference to the nine macro-areas, is scaleable and adaptable so as to adjust to the resolution of any screen used.

A schematic representation of operation of the system may, for example, be the one illustrated in FIG. 12.

As illustrated schematically in FIG. 12, in various embodiments, upon approach of a finger DT over a macro-area of the screen (i.e., when the finger DT approaches one of the nine macro-areas), the system responds by detecting this presence and supplying at output a value associated with the macro-area concerned. In particular, the system has detected the presence of a finger DT and has associated with this detection one of the areas of the screen (in particular, in the example illustrated the central left area). Experimentally, for example, it is possible to visualize the above assignment by drawing a circle P on the PC display in the area corresponding to the area of the screen on which the presence of the finger is detected.

As illustrated schematically in FIG. 13(a), raw data of a capacitive type 10 are supplied at input to a system 20. The system 20 analyzes the raw data for detecting the position of a finger DT hovering over the screen S. The system 20 exploits projected capacitive technology to yield at output the position 30 of the finger on the screen.

The raw data 10 are the raw data in the directions X and Y, which are supplied at input to the system 20. The system 20 in a first module 22 constructs the 2D matrix M. The system 20 in a second module 24 divides the 2D matrix M into six bands. In particular, the matrix M is divided into three horizontal bands (A, B, C) and three vertical bands (D, E, F). Finally, in a module 26, the system 20 recognizes and identifies the position of the finger, one from among the nine possible positions 1, 2, 3, 4, 5, 6, 7, 8, 9, and returns it as parameter 32 at output.

It has then been noted that advantages of an unlocking solution that works in hovering mode (i.e., without touching the screen) are multiple. In particular, as regards security, it should be emphasized that no finger marks remain on the screen, and that the data of the accelerometer cannot be used because there has been no operation of typing-in data.

The steps that are carried out in each module of the system 20 will now be described in greater detail.

In particular, in the module 22 the 2D matrix (see, for example, FIG. 8) is constructed starting from the 1D raw data.

In various embodiments, each element of the 16×16 matrix M (i, j) is equal to the mean value of its co-ordinates X(i) and Y(j).

In particular, in the module 22 the elements of the matrix M are computed as $$M(i, j) = \frac{X(i) + Y(j)}{2}$$

with the indices i and j ranging from 0 to 15.

In various embodiments, M(i, j) is an element of the matrix (of position: row i, column j) and is computed starting from the values of capacitance of the nodes set on the axis X and on the axis Y.

Figures 17, 18, 19:
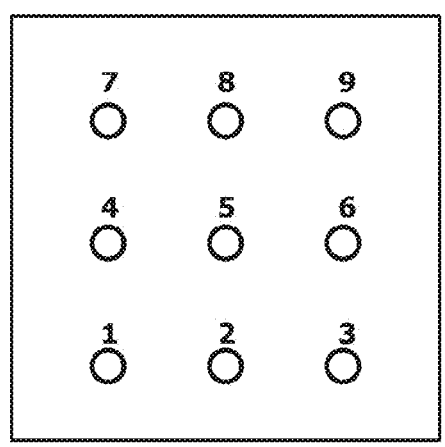
FIGS. 18, 19 and 20 show a division of a matrix M into rows and columns for defining a macro-areas.

In particular, in various embodiments, in the module 24, the 16×16 matrix M computed in the preceding module is divided into bands, for example six bands (see FIGS. 18 and 19).

For each of the six bands, a cumulative value is computed, which is given by the sum of all the capacitive values of the nodes belonging to that band. The cumulative values are designated by A, B, C, D, E, and F.

Figures 20, 21:
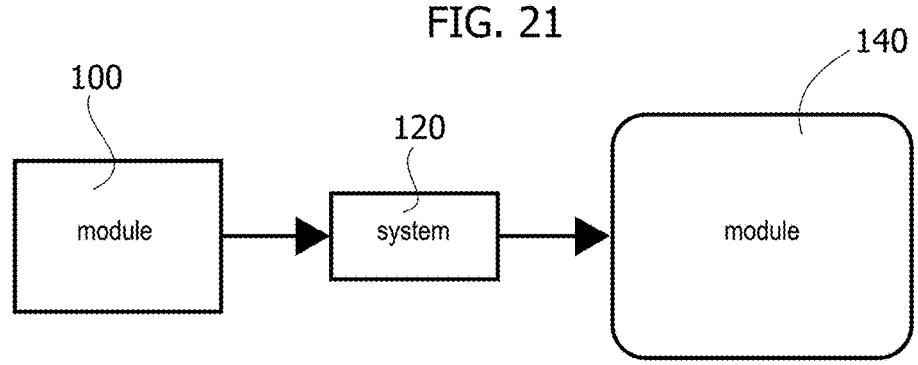
FIG. 21 is a block diagram exemplifying a system for detecting hovering of a hand above a screen.

Considering the intersection/superposition of the horizontal bands (A, B, C) and vertical bands (D, E, F), it is possible to identify nine macro-areas (see FIG. 20).

In various embodiments, the matrix M is divided into three horizontal bands A, B, C, as illustrated, for example, in FIG. 18, by dividing, for instance, the first fifteen rows available, i.e., with i ranging from 0 to 14, into three subgroups of five rows per band, and not considering the fifteenth row.

In various embodiments, the matrix M is also divided into three vertical bands D, E, F, as illustrated, for example, in FIG. 19, by dividing, for instance, the first fifteen columns available, i.e., with j ranging from 0 to 14, into three subgroups of five columns per band, and not considering the fifteenth column.

In other embodiments, it is possible to neglect the first row and the first column of the matrix M, or otherwise, any row and column at will; furthermore, it is contemplated that one or more of the bands have different numbers of rows or columns than another one, or other ones, of the bands.

Once again with reference to the various embodiments, in the module 24 the cumulative values (A, B, C, D, E, F) are moreover computed according to the following formulas:

$$A = \sum_{i=0}^{4} \sum_{j=0}^{14} M(i, j)$$

$$B = \sum_{i=5}^{9} \sum_{j=0}^{14} M(i, j)$$

$$C = \sum_{i=10}^{14} \sum_{j=0}^{14} M(i, j)$$

$$D = \sum_{i=0}^{14} \sum_{j=0}^{4} M(i, j)$$

$$E = \sum_{i=0}^{14} \sum_{j=5}^{9} M(i, j)$$

$$F = \sum_{i=0}^{14} \sum_{j=10}^{14} M(i, j)$$

In various embodiments, the matrix M has an "even" size; hence, to obtain the same dimensions for the bands the last row and the last column of the matrix can be neglected. Instead, in other embodiments, also the last row and last column are included in the calculation of the cumulative values A, B, C, D, E, F.

Furthermore, in various embodiments, identified in the module 26 is the position of the finger DT on the screen S.

In particular, with reference to FIG. 20, by superimposing the bands, exactly nine macro-areas are formed, identified by the numbers 1, 2, 3, 4, 5, 6, 7, 8, 9.

In particular, the macro-area 1 is located where the horizontal band A and the vertical band D cross, i.e., in the top left of the matrix M.

For instance, the macro-area 2 is located where the horizontal band A and the vertical band E cross, i.e., in the top center of the matrix M, and so forth.

In various embodiments, the position of the finger DT is associated, for example, with the macro-area 1, if the maximum from among the horizontal cumulative values (A, B, C) is equal to A, and the maximum from among the vertical cumulative values (D, E, F) is equal to D.

To sum up, then, the macro-area over which the finger DT is positioned is identified as follows:

macro-area 1: if max (A, B, C)=A and max (D, E, F)=D
macro-area 2: if max (A, B, C)=A and max (D, E, F)=E
macro-area 3: if max (A, B, C)=A and max (D, E, F)=F
macro-area 4: if max (A, B, C)=B and max (D, E, F)=D
macro-area 5: if max (A, B, C)=B and max (D, E, F)=E
macro-area 6: if max (A, B, C)=B and max (D, E, F)=F
macro-area 7: if max (A, B, C)=C and max (D, E, F)=D
macro-area 8: if max (A, B, C)=C and max (D, E, F)=E
macro-area 9: if max (A, B, C)=C and max (D, E, F)=F In various embodiments, the system 20 then supplies at output the macro-area over which the finger DT detected by the screen is positioned.

With reference to FIGS. 17 and 20, it may, for example, be assumed that a finger present over the macro-area 1 (see FIG. 20) is associated with the number "seven" (see FIG. 17), a finger over the macro-area 8 (see FIG. 20) is associated with the number "two" (see FIG. 17), and so forth.

Otherwise, it may be assumed that the number "one" is associated with the macro-area 1, the number "two" is associated to the macro-area 2, and so forth.

For this type of application, it is not necessary to detect precisely the position of the finger over the screen, but it is sufficient to identify over which macro-area the finger is located to understand which digit it is intended to select.

FIGS. 14, 15, and 16 illustrate various tests to which the system 20 has been subjected.

In particular, with reference to FIG. 14, if two fingers D1 and D2 are positioned on or over the screen S in any two output positions, paying attention to maintaining the same distance of the two fingers from the screen, the system 20 does not return any output value. This happens, because if two bands that belong to one and the same axis (X or Y), reach the same cumulative value (or a very similar value), then the system 20 rejects this condition and does not detect the presence of either of the fingers.

FIG. 14 shows how a simulation of the system 20 reacts to the presence of two fingers over the screen at the same distance and in the positions of macro-area 1 and macro-area 4. None of the nine elements of the matrix is activated on the PC display; hence, the system does not detect the presence of the two fingers on or over the screen.

A further test is that of positioning a fist, as in FIG. 15(a), or a hand with the palm open over the screen S, as in FIG. 15(b).

The system 20 refuses to recognize the first and the open hand, and does not return values at output as response to this stimulus. If one attempts to select an element of the matrix M, i.e., a macro-area, by setting a first close to the screen S, the system 20 does not return any output value because it carries out a general check on all the cumulative values calculated.

In this case, no circle appears on the display PC.

A similar behavior may be noted in the case where the hand with the palm open is placed over the screen S. In this last case, there is a check on the minimum value of the cumulative values. If the minimum is above a certain threshold, then the system 20 does not return any value at output.

In this case, i.e., if min (A, B, C, D, E, F) exceeds a threshold TH, then none of the elements of the matrix M is lit up and no position is activated.

Also in this case, the value is rejected, and the system prepares for the next detection, waiting for a finger over just one of the macro-areas.

A further test has been carried out. With reference to FIGS. 16(a) and 16(b), in the case of the presence of a finger and of a first over the screen, the system 20 returns at output a value if the finger is pointing to the screen in a natural way, i.e., with a natural position of the hand, with an angle of approximately 45° between the plane of the screen and a straight line that passes through the finger (see FIG. 16(a)). In particular, the first (or rather the part of hand that includes the metacarpus up to the wrist) is located at a greater distance from the screen with respect to a line L parallel to the screen and passing through the fingertip DT.

Instead, in the case of FIG. 16(b), if the closed-fist part is very close to the screen, or else located at a distance comparable with the distance of the fingertip, or else is located on the line L, the system 20 does not return any output value.

The sensitivity of the system enables handling of the problem of the ghost first or palm, i.e., of the possibility of a first or palm obscuring or modifying detection of the presence of a finger.

The difference between FIGS. 16(a) and 16(b) is indeed minimal, but in the former case the system 20 detects the finger DT and does not detect the first H.

In the case of the condition illustrated in FIG. 16(b), i.e., when the first H is at a distance equal, or approximately equal, to the distance of the finger DT from the screen, the system 20 blocks the output and no value is returned. This arrangement prevents the system 20 from returning erroneous outputs due to the ghost fist.

FIG. 16(a) represents an example in which the system 20 returns an output value. In particular, a dot lights up at the center on the PC display, and this means that the system 20 has recognized the position of a finger DT at the center of the screen S, i.e., in the central macro-area 5.

Instead, FIG. 16(b) represents an example in which the system 20 does not recognize the presence of a finger, and no dot is activated on the PC display.

In various embodiments, the system 20 receives at input raw capacitive data (in the examples two vectors X and Y of sixteen elements each) and detects the approach of a finger DT toward the screen S. The system returns at output a number that corresponds to one of the possible positions of the finger DT on the screen.

In various embodiments, the system 20 enables a solution of many to all of the problems that may be encountered with touch screens in those cases where it is possible to envisage an attack aimed at reconstructing the sequence of a password so as to be able to use it fraudulently.

Furthermore, the system 20 described presents a low computational complexity, which renders it suited to all types of devices, such as, for example, smartphones, tablets, PCs, ATMs, etc.

The embodiments so far described are to unlock a device by entering a password in the proximity space of the surface of the screen.

The size of the area of each band may be scaled and adapted to the resolution of the screen.

In various embodiments, the value at output from the system 20, which indicates the position of the finger over the screen, is selected by comparing the six cumulative values of the current frame.

After dividing the 2D matrix into six bands and computing the corresponding cumulative values, the system selects the maximum value from among the three horizontal cumulative values and the maximum value from among the three vertical cumulative values calculated.

As already mentioned previously, located at the intersection of the two bands corresponding to the two maximum cumulative values (for example A, F) is the area of the screen in which the larger number of capacitive nodes has been excited on account of the presence of a finger positioned over said area.

The system proposed detects the position of the finger at the level of a macro-area and is fundamentally based upon the assumption that the presence of a conductive element (i.e., the finger) excites a set of adjacent nodes on the axis X and a set of adjacent nodes on the axis Y, which correspond to excitation of a set of elements of the 2D matrix constructed by the module 22. As mentioned previously, the area is selected by comparing the cumulative values of the six bands.

One of the problems to be considered with this type of system is the problem of the palm of the hand or of the first over the screen, the presence of which could obscure the presence of a finger.

The system 20 handles the problem of the palm of the hand or of the first by comparing the six cumulative values. In particular, the system 20 carries out a further check to see whether the minimum of the six cumulative values is beyond a given threshold. If so, the presence of a palm/fist over the screen is recognized, and the system does not return any value at output.

As already mentioned previously, the use of screens of a touchless type that exploit projected capacitive technology may be very useful in certain specific environments, such as, for example, the automotive sector. In this context, hovering based upon a very simple gesture can help the driver not to draw his attention away from the road.

The system described can be used also for detection of the position of a hand in five macro-areas of the screen: left, right, top, bottom, and center.

Through a temporal collection of sequences of portions of the hand (for example, right-center-left), it is possible to detect the hovering displacement of the hand.

In various embodiments, the system could be used in contexts where a high precision of detection is not required, for example, on account of the fact that the user might not be able to pay attention to the screen.

One of the best examples of application in which a low precision is required for detecting the movement of the hand over the screen is, as has already been mentioned, the automotive sector, where the driver cannot take his eyes off the road, for example to select/scroll an icon on the screen, for example, in the case of a navigator. In this type of context, the system may be useful for carrying out simple gestures on the touchless screen for activation of the desired functions (navigation within a map, scrolling of the icons of the menu, etc.).

Furthermore, the system may be used in all these applications, such as for example, videogames, where hovering of the hand, or of the finger, above the screen can perform the same control functions as an ordinary joystick.

In various embodiments, the system is able to interpret hovering of the hand as the intention to make a given gesture selected from a set of basic gestures.

The hand is recognized in five different positions above the screen, i.e., right, left, top, bottom, center, and a gesture of zooming-in or zooming-out may also be detected.

By adding a temporal analysis of the position of the hand (which is detected frame by frame) it is possible to detect a gesture of hovering in one of the four directions, right, left, top, or bottom.

In various embodiments, for example, the system carries out recognition of the position of the hand in five macro-areas of the panel: left, right, top, bottom, and center. To detect these five positions, the 2D matrix (computed as in the previous examples) is divided into four bands: left, right, top, and bottom.

Figures 22, 23, 24:
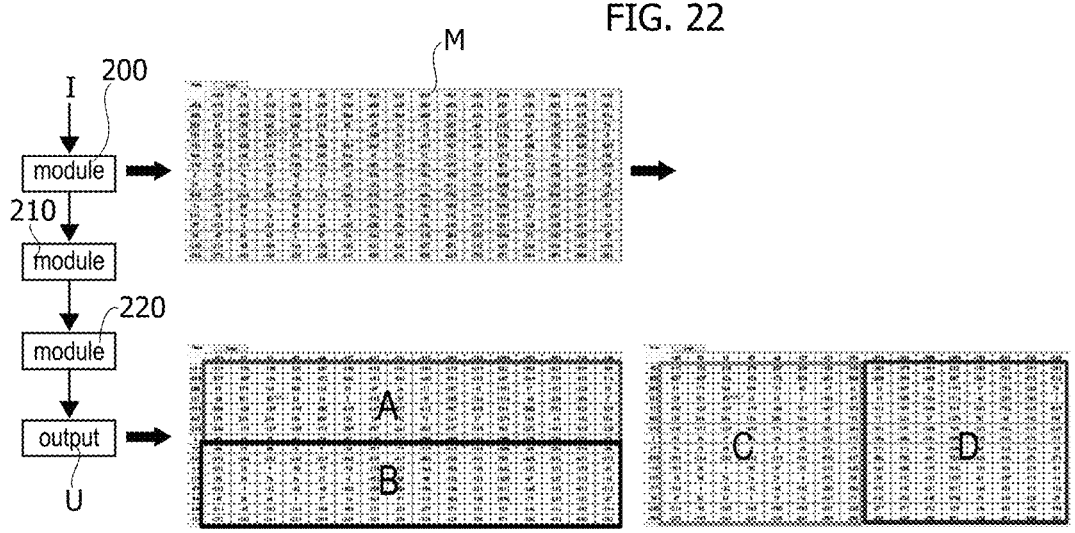
FIGS. 22 and 26 are block diagrams exemplifying a system for detecting a hand above a screen, in one of the positions: center, right, left, top, and bottom.
FIGS. 23 and 24 show a division of a matrix M into rows and columns for defining four macro-areas.

FIGS. 23 and 24 are examples of a division into four macro-areas of the screen.

In various embodiments, the matrix M is divided into two horizontal bands A, B, as illustrated, for example, in FIG. 23. The matrix M is divided into half horizontally by dividing, for instance, the sixteen rows available, with i ranging from 0 to 15, into two subgroups of eight rows per band.

In various embodiments, the matrix M is also divided into two vertical bands C, D as illustrated for example in FIG. 24. The matrix M is divided into half vertically by dividing, for instance, the sixteen columns available, with j ranging from 0 to 15, into two subgroups of eight columns per band.

Designated by the reference A is the cumulative value that represents the macro-area "top"; designated by the reference B is the cumulative value that represents the macro-area "bottom".

In a similar way, designated by the reference C is the cumulative value that represents the macro-area "left", and designated by D is the macro-area "right".

In various embodiments, the system is used for applications in environments in which it is not necessary to carry out detection at the level of precision of a single node.

For instance, a good field of application is the automotive sector in which the driver can select a function in proximity mode, without taking his eyes off the road.

As in the previous embodiments, i.e., those regarding unlocking of a device in hovering mode, also these embodiments are based upon the use of the cumulative values of the macro-areas for generating an output value for the system, which identifies the position of the hand over a given macro-area.

The system returns at output five positions: top, bottom, right, left, and center. The system identifies the macro-area over which the hand moves in hovering mode by comparing the four values (A, B, C, and D).

In the first place, the system carries out the check for the presence of the hand over the central part of the screen, and if it is not present, the system looks for the presence of the hand in the other four positions (top, bottom, left, and right).

The central area is selected if all four of the cumulative values are beyond a given threshold.

Otherwise, the area selected is the one that has the maximum cumulative value from among A, B, C, and D.

By adding a time check, it is possible to detect the direction of hovering or displacement of the hand. In particular, the sequences of positions as right-center-left correspond to a hovering to the left, i.e., to a displacement of the hand to the left.

Likewise, a sequence top-center-bottom corresponds to a hovering downwards. The sequence bottom-center-top corresponds to a hovering upwards. Finally, the sequence left-center-right corresponds to a hovering to the right.

The system described detects also the gesture of zooming for all five outputs. The approach used here for detection of zooming can be applied to all the embodiments previously described (for example, for unlocking the device in hovering mode), with minor modifications and re-formulations so as to take into account the nine macro-areas pointed to and selected by the finger.

The system considered is also able to recognize for each of the five areas the operations of zoom-in and zoom-out performed by the hand.

The detection of the zooming operation is based upon the variation in time of the cumulative values.

In various embodiments, four thresholds have been fixed for defining four distances d1, d2, d3 and d4 (see FIG. 25) of the hand from the screen.

In this way, a discretization of the space in the proximity of the screen is obtained.

The system classifies the distance of the hand from the screen by comparing the cumulative values computed starting from the matrix M with some thresholds.

Zooming is a gesture that can be performed in two directions, "zooming-in" and "zooming-out". Hence, to detect the movement of zooming, the system examines the variation in time of the cumulative values. If it has an increasing trend, it means that the hand is approaching the screen (zooming-in); otherwise, in the case of a decreasing trend, the hand is moving away from the screen (zooming-out).

In greater detail, the system detects frame by frame (instant by instant) the position of the hand over the screen. The possible positions are top (U), bottom (D), right (R), left (L), and center (C).

Furthermore, considering a time analysis, the system may be useful for recognition of a zooming operation, i.e., of displacement of the hand.

With reference to FIG. 21, the movement of the hand over the screen is detected by a module 100. This detection generates at input to the system 120, 32 raw data, i.e., sixteen raw data in the direction X and sixteen raw data in the direction Y. The system 120 calculates the position of the hand and generates at output a value that identifies one of the areas where the hand may be located.

The output values, as indicated in the module 140, may number six, considering that the central area C is considered both in the division into horizontal bands and in the division into vertical bands.

The steps that are carried out in each module of the system 120 will now be described in greater detail.

With particular reference to FIG. 22, the raw data X and Y are supplied at input to a module 200, and are designated as a whole by the reference I.

The module 200 constructs the matrix M (16×16) starting from the data at input.

The matrix M is a matrix of integers in which each element is the mean value between its corresponding capacitive data X and Y, corresponding to the node (i, j). In greater detail, each element of the matrix M is computed as $$M(i, j) = \frac{X(i) + Y(j)}{2}$$

with the indices i, j ranging from 0 to 15.

The next module 210 receives at input the matrix M, divides it into four areas, and calculates for each area the corresponding cumulative value A, B, C, and D.

In particular, for example the four cumulative values may be defined as follows:

$$A = \sum_{i=0}^{7} \sum_{j=0}^{15} M(i, j)$$

$$B = \sum_{i=8}^{15} \sum_{j=0}^{15} M(i, j)$$

$$C = \sum_{i=0}^{15} \sum_{j=0}^{7} M(i, j)$$

$$D = \sum_{i=0}^{15} \sum_{j=8}^{15} M(i, j)$$

The module 220 makes a comparison between the four cumulative values and, on the basis of rules, returns the position of the hand at output U.

In particular, if the minimum value min (A, B, C, D) exceeds a threshold TH (min (A, B, C, D)>TH), then the hand is located at the center of the screen, and the module 220 returns the value "center" at output.

The module 220 returns as position of the hand the value "left" if max (A, B, C, D)=C.

The module 220 returns as position of the hand the value "right" if max (A, B, C, D)=D.

The module 220 returns as position of the hand the value "top" if max (A, B, C, D)=A.

The module 220 returns as position of the hand the value "bottom" if max (A, B, C, D)=B.

Detection of the operations of zooming-in and zooming-out are based upon the evaluation of the level of force (i.e., the magnitude) of the cumulative values taken into consideration. The shorter the distance between the hand and the screen, the higher the force of the cumulative values. By applying different thresholds to the cumulative values, the system is able to sample the distance of the hand from the screen, in a fixed number of steps.

Through a time analysis it is moreover possible to recognize whether the force of the cumulative values increases or decreases, and in this way the system is able to distinguish the gestures of zooming:

zoom in=when the hand is approaching the screen; and
zoom out=when the hand is moving away from the screen.

Usually, control of zooming is implemented for the central area, but can be extended also to the other four areas.

Figure 25:
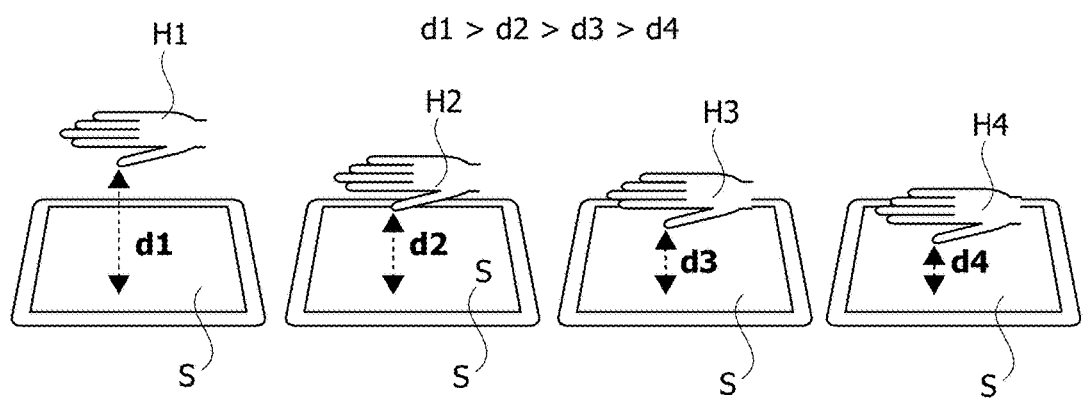
FIG. 25 exemplifies the operations of zooming performed by a hand over a screen.

FIG. 25 exemplifies the different positions that the hand can assume with respect to the screen. Given that "d" is the distance between the hand and the screen and "M" the force of the cumulative value, we have the following relation:

$$d1>d2>d3>d4 \rightarrow M1<M2<M3<M4$$

Again with reference to FIG. 25, the hand H1 is further away than the hand H4, and the corresponding cumulative value M1 is smaller than the cumulative value M4. This is due to the fact that the more distant hand excites the nodes of the screen to a lesser extent.

An alternative system will now be described, which carries out the same analysis on the 1D raw data.

The same analysis performed on the 2D matrix can be carried out on the 1D raw data. This approach enables reduction of the computational complexity, but also reduces the accuracy of the detection of the position of the hand (probably on account of the different sensitivity of the nodes in X and Y).

Figure 26:
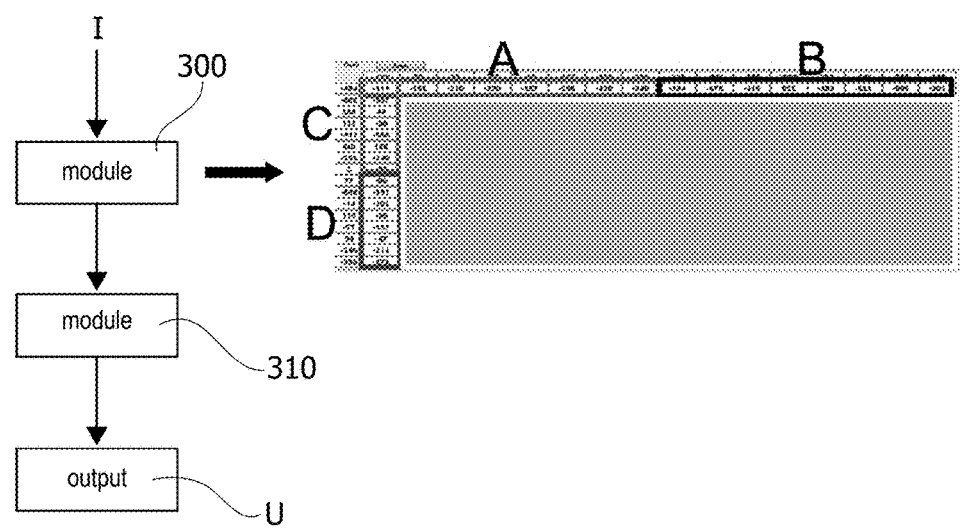

With reference to FIG. 26, the raw data X and Y are fed at input I to a module 300. The module 300 calculates the cumulative values as sums of the subsets of raw data.

$$A = \sum_{i=0}^{7} X(i)$$

$$B = \sum_{i=8}^{15} X(i)$$

$$C = \sum_{i=0}^{7} Y(i)$$

$$D = \sum_{i=8}^{15} Y(i)$$

The module 310 compares the cumulative values just computed and generates an output value equal to the position of the hand above the screen, and the output can assume one of these values:

"center"→min (A, B, C, D)>TH
"left"→max (A, B, C, D)=A
"right"→max (A, B, C, D)=B
"top"→max (A, B, C, D)=C
"bottom"→max (A, B, C, D)=D Embodiments described herein are mainly based upon calculation of cumulative values and upon the comparison of said values for deciding which macro-area is selected. Hence, these embodiments are suited for all devices equipped with touchless screen, including devices with a limited amount of computing resources.

Embodiments proposed herein manage the presence of a first or an open hand above the screen, and can be sized and scaled as desired, according to the different dimensions and the resolution of the screens on which they are applied.

Without prejudice to the principles underlying the disclosure, the details and the embodiments may vary, even appreciably, with respect to what has been described herein purely by way of non-limiting example, without thereby departing from the spirit and scope of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system, comprising:
a display screen having nodes and configured to generate detection signals for the nodes; and
a controller configured to determine over which one of a plurality of multi-node regions of the display screen an object is present in response to the detection signals, the controller further configured to:
receive the detection signals generated by the display screen, the detection signals including detection signals in a horizontal direction and a vertical direction of the display screen where the detection signals have values indicating the presence of a finger in a position proximate the display screen;
generate a raw-data vector X based on the detection signals in the horizontal direction and a raw-data vector Y based on the detection signals in the vertical direction, wherein the raw-data vectors X and Y each include a plurality of elements having values based on the position of the finger in the horizontal and vertical directions;
divide the elements of the raw-date vectors X and Y into a plurality of subsets, each subset being associated a corresponding multi-node region of the display screen;
compute a horizontal cumulative value for each subset of the raw-data vector X by adding together all the elements of the raw-data vector X that belong to the subset;
compute a vertical cumulative value for each subset of the raw-data vector Y by adding together all the elements of the raw-data vector Y that belong to the subset;
select maximum values from among the horizontal cumulative values and the vertical cumulative values;
provide an output value that identifies a selected one of the plurality of multi-node regions based on the selected maximum values; and
provide no output value based on the selected maximum values when the selected maximum values indicate the presence of a disturbance proximate the display screen so that no multi-node region is identified when the selected maximum values indicate the presence of a disturbance proximate the display screen.

2. The system of claim 1 wherein:
the display screen includes
first groups of subnodes, each group oriented along a first dimension, and
second groups of subnodes, each second group oriented along a second dimension; and
each node is located at an intersection of a respective subnode of one of the first groups and a respective subnode of one of the second groups.

3. The system of claim 1 wherein the display screen has touchless capability.

4. The system of claim 1 wherein each detection signal indicates a distance between the object and the node with which the detection signal is associated.

5. The system of claim 1 wherein each detection signal corresponds to a capacitance between the object and the node with which the detection signal is associated.

6. The system of claim 1 wherein each detection signal is associated with a respective subnode of a respective node.

7. The system of claim 1, wherein the controller is further configured to identify:
first multi-node bands of the display screen oriented in a first dimension;
second multi-node bands of the display screen oriented in a second dimension; and
intersecting regions of ones of the first and second multi-node bands as multi-node regions of the display screen.

8. The system of claim 1 wherein the controller is further configured to identify:
first multi-node bands of the display screen oriented in a first dimension;
second multi-node bands of the display screen oriented in a second dimension that is approximately perpendicular to the first dimension; and
intersecting regions of ones of the first and second multi-node bands as multi-node regions of the display screen.

9. The system of claim 1 wherein the controller is further configured
to determine that the multi-node region over which the object is present is the multi-node region having the greatest horizontal and vertical cumulative values.

10. The system of claim 1 wherein the controller is further configured
to determine that the multi-node region over which the object is present is approximately at a center of the screen if each of the cumulative values is greater than a threshold.

11. The system of claim 1 wherein the controller is further configured
to determine that no object is present over any of the multi-node regions if a minimum of the cumulative values is greater than a threshold.

12. A method for detecting the presence of a finger proximate a screen, the method comprising:
receiving detection signals generated by the screen, the detection signals including detection signals in a horizontal direction and a vertical direction of the screen where the detection signals have values indicating the presence of a finger in a position proximate the screen;
generating a raw-data vector X based on the detection signals in the horizontal direction and a raw-data vector Y based on the detection signals in the vertical direction, wherein the raw-data vectors X and Y each include a plurality of elements having values based on the position of the finger in the horizontal and vertical directions;
dividing the elements of the raw-date vectors X and Y into a plurality of subsets to define a plurality of macro-areas;
computing a horizontal cumulative value for each macro-area of the raw-data vector X by adding together all the elements of the raw-data vector X that belong to the macro-area;
computing a vertical cumulative value for each macro-area of the raw-data vector Y by adding together all the elements of the raw-data vector Y that belong to the macro-area;
selecting maximum values from among the horizontal cumulative values and the vertical cumulative values;
providing an output value that identifies a selected one of the macro-areas based on the selected maximum values, the selected one of the macro-areas corresponding to a portion of the screen having the finger positioned proximate that portion of the screen; and
providing no output value based on the selected maximum values when the selected maximum values indicate the presence of a disturbance proximate the screen.

13. The method of claim 12 further comprising:
generating a matrix M representing the screen starting from the raw-data vectors X and Y; and
computing each individual element of the matrix M as a mean value of the corresponding elements of the raw-data vectors X and Y according to the formula $$M(i, j) = \frac{X(i) + Y(j)}{2}$$

wherein i and j are indices that identify each of the elements of the raw-data vectors X and Y.

14. The method of claim 13 further comprising:
dividing the matrix M into macro-areas; and
computing the cumulative values of each macro-area by adding together all the elements of the matrix M that belong to the macro-area.

15. The method of claim 14 further comprising selecting the minimum value from among the computed cumulative values of each macro-area and, if the minimum value exceeds a threshold, providing no output value.

16. The method of claim 15 further comprising associating with each macro-area a numeric value that identifies the macro-area.

17. The method of claim 16 further comprising repeating the receiving detection signals through providing the output value based on the selected maximum values a plurality of times to obtain a sequence of selected numeric values to thereby sense an unlocking sequence or password.

18. The method of claim 17 further comprising:
capturing frames of the received detection signals over time, each frame being captured at an instant in time;
performing the steps of generating the raw-data vectors X and Y through providing the output value on successive frames captured over a period of time;
identifying a hovering action if the selected maximum values move in the period of time over different macro-areas; and
identifying a zooming action if the maximum selected maximum values in the period of time vary in intensity but do not move over different macro-areas over the period of time.

* * * * *